(12) United States Patent
Frejd (10) Patent No.: US 8,142,116 B2
(45) Date of Patent: Mar. 27, 2012

(54) TOOL FOR ROTARY CUTTING MACHINING

(75) Inventor: Stefan Frejd, Söderköping (SE)

(73) Assignee: Seco Tools AB, Fagersta (SE)

( * ) Notice: Subject to any disclaimer, the term of this patent is extended or adjusted under 35 U.S.C. 154(b) by 459 days.

(21) Appl. No.: 12/423,271

(22) Filed: Apr. 14, 2009

(65) Prior Publication Data

US 2009/0311060 A1    Dec. 17, 2009

(30) Foreign Application Priority Data

Apr. 14, 2008    (SE) ...................................... 0800833

(51) Int. Cl.
*B23B 51/02* (2006.01)

(52) U.S. Cl. .......................... 408/231; 408/226; 408/230

(58) Field of Classification Search .......... 408/226–233, 408/713, 144; *B23B 51/00, 51/02*
See application file for complete search history.

(56) References Cited

U.S. PATENT DOCUMENTS

| | | | |
|---|---|---|---|
| 3,304,816 A * | 2/1967 | Galorneau | 408/226 |
| 5,971,673 A | 10/1999 | Berglund et al. | |
| 5,988,953 A | 11/1999 | Berglund et al. | |
| 6,059,492 A * | 5/2000 | Hecht | 408/144 |
| 6,506,003 B1 * | 1/2003 | Erickson | 408/226 |
| 6,582,164 B1 * | 6/2003 | McCormick | 408/226 |
| 7,407,350 B2 * | 8/2008 | Hecht et al. | 408/231 |
| 7,972,094 B2 * | 7/2011 | Men et al. | 408/231 |
| 2002/0159851 A1 * | 10/2002 | Krenzer | 408/230 |
| 2005/0084352 A1 * | 4/2005 | Borschert et al. | 408/226 |
| 2008/0025806 A1 * | 1/2008 | de Souza | 408/230 |

FOREIGN PATENT DOCUMENTS

| | | | |
|---|---|---|---|
| JP | 01097512 A | * | 4/1989 |
| JP | 2005169542 A | * | 6/2005 |
| JP | 2006231434 A | * | 9/2006 |
| WO | WO 2008014367 A1 | * | 1/2008 |

* cited by examiner

*Primary Examiner* — Daniel Howell
(74) *Attorney, Agent, or Firm* — WRB-IP LLP (57) ABSTRACT

A tool for rotary cutting machining includes a tool body and a replaceable cutting head detachably attachable to the tool body. At its front end, the tool body is provide with two coupling legs projecting in an axial direction. The respective coupling leg is provided with a stop surface for transferring torque from the tool body to the cutting head, which stop surface is designed for abutment against a corresponding stop surface of the cutting head. The respective coupling leg is provided with a shoulder protruding from the stop surface of the coupling leg. The cutting head is provided with two shoulders facing the front end of the cutting head and arranged on opposite sides of the center axis of the cutting head, which shoulders border on a respective one of said stop surfaces of the cutting head and are arranged to extend in under a respective one of said shoulders of the coupling legs of the tool body when the cutting head is attached to the tool body, so as to thereby present the cutting head from being displaced in axial direction away from the tool body. The invention also relates to a tool body and a cutting head included in such a tool.

16 Claims, 4 Drawing Sheets

TOOL FOR ROTARY CUTTING MACHINING

BACKGROUND AND SUMMARY

The present invention relates to a tool for rotary cutting machining with a tool body and a replaceable cutting head detachably attachable to the tool body. The invention also relates to a tool body and a cutting head included in such a tool.

A tool for rotary cutting machining is previously known from U.S. Pat. No. 5,988,953 A and U.S. Pat. No. 5,971,673 A. In this known tool, the mutual gripping surfaces of the tool body and the cutting head are conical and widen in the direction towards the rear end of the tool body and the cutting head, respectively, so as to thereby achieve a positive locking in axial direction between the tool body and the cutting head. This positive locking prevents the cutting head from being displaced in axial direction away from the tool body, for instance when the tool is pulled out of a bore drilled by means of the tool. A disadvantage with these conical gripping surfaces is that the tolerance requirements are high for these surfaces and that they are relatively complicated to achieve by, means of mechanical machining.

It is desirable to achieve a tool of the type mentioned by way of introduction with a new and favorable design.

According to an aspect of the present invention, a tool for rotary cutting machining comprises a tool body and a replaceable cutting head detachably attachable to the tool body, wherein:

- the tool body at its front end has a coupling portion with two coupling legs projecting in the axial direction of the tool body and arranged on opposite sides of the center axis of the tool body;
- the cutting head has a coupling portion, which is designed for engagement with the coupling portion of the tool body and which is receivable in a space between the coupling legs of the coupling portion of the tool body;
- internal gripping surfaces are arranged in the space of the coupling portion of the tool body, which are designed for engagement with corresponding external gripping surfaces of the coupling portion of the cutting head;
- the respective coupling leg is provided with a stop surface intended to transfer torque from the tool body to the cutting head, which stop surface is designed for abutment against a corresponding stop surface of the coupling portion of the cutting head and which extends in parallel with the center axis of the tool body or, starting out from its rear edge, is inclined forward in the intended machining direction of rotation of the tool body;
- the coupling portion of the cutting head is turnable in the space of the coupling portion of the tool body about the center axis of the cutting head to and fro between a free position, in which the stop surfaces of the coupling portion of the cutting head do not abut against the corresponding stop surfaces of the coupling legs and the gripping surfaces of the cutting head are not in holding engagement with the corresponding gripping surfaces of the tool body, and an engagement position, in which the stop surfaces of the coupling portion of the cutting head abut against the corresponding stop surfaces of the coupling legs and the gripping surfaces of the cutting head are in holding engagement with the corresponding gripping surfaces of the tool body;
- the respective coupling leg is provided with a shoulder protruding from the stop surface of the coupling leg; and
- the cutting head is provided with two shoulders facing the front end of the cutting head and arranged on opposite sides of the center axis of the cutting head, which shoulders border on a respective one of the stop surfaces of the coupling portion of the cutting head and are arranged to extend in under a respective one of the shoulders of the coupling legs of the tool body when the coupling portion of the cutting head is in the engagement position in the space of the coupling portion of the tool body so as to thereby prevent the cutting head from being displaced in axial direction away from the tool body.

In the tool according to the invention, the cutting head is prevented from being displaced in axial direction away from the tool body by means of a shoulder protruding from the torque carrying stop surface of the respective coupling leg, which shoulder is designed to extend out over a shoulder of the cutting head facing the front end of the cutting head, when the cutting head is attached to the tool body. The axial freedom of movement of the cutting head in relation to the tool body in the direction away from the tool body is consequently limited by these shoulders of the coupling legs of the tool body, and the cutting head is forced by these shoulders to accompany the tool body when the tool body is pulled in axial direction out of a bore drilled by means of the tool. With the solution according to the invention this axial locking of the cutting head to the tool body is achieved without requiring any conical sections in the mutual gripping surfaces of the tool body and the cutting head. These gripping surfaces can thereby be given a shape that is simplified and favorable with respect to the manufacturing of the tool body and the cutting head.

According to a favorable embodiment of the invention the stop surface of the respective coupling leg extends in parallel with the center axis of the tool body and the corresponding stop surface of the cutting head extends in parallel with the center axis of the cutting head. By letting the stop surfaces of the tool body be parallel with the center axis of the tool body, an achievement of these stop surfaces by mechanical machining of a blank prepared for the formation of a tool body is facilitated, and by letting the stop surfaces of the cutting head be parallel with the center axis of the cutting head, an achievement of these stop surfaces by mechanical machining of a blank prepared for the formation of a cutting head is facilitated.

According to another favorable embodiment of the invention, the angle between the stop surface of a coupling leg and the shoulder protruding from this stop surface is between 80-90°, preferably 90°. An angle of 90° is here particularly favorable, since this will give a right-angled design which facilitates the manufacturing of the tool body.

According to another favorable embodiment of the invention, there is in the normal state of the tool a clearance between the respective shoulder of the coupling legs and the corresponding shoulder of the cutting head when the cutting head is attached to the tool body. Hereby, there is no risk of wear between the mutually co-operating shoulders and the tolerance requirements on these shoulders will also be very low.

According to another favorable embodiment of the invention, each one of said shoulders of the cutting head is arranged on the upper side of the cutting head and preferably formed by a depression in a clearance surface arranged on the upper side of the cutting head. Hereby, the shoulders of the cutting head can be achieved in a simple manner and these shoulders will not interfere with the remaining design of the cutting head.

According to another favorable embodiment of the invention, the internal gripping surfaces of the coupling portion of the tool body are cylindrical and extend in parallel with the center axis of the tool body, and the external gripping surfaces of the coupling portion of the cutting head are cylindrical, extend in parallel with the center axis of the cutting head and have a radius which is larger than the radius of said internal gripping surfaces. By letting the gripping surfaces of the tool body be cylindrical and parallel with the center axis of the tool body, an achievement of these gripping surfaces by mechanical machining of a blank prepared for the formation of a tool body is facilitated, and by letting the gripping surfaces of the cutting head be cylindrical and parallel with the center axis of the cutting head, an achievement of these gripping surfaces by mechanical machining of a blank prepared for the formation of a cutting head is facilitated.

According to another favorable embodiment of the invention, the internal gripping surfaces of the coupling portion of the tool body are arranged on the inside of a respective one of said coupling legs at the level of the stop surface of the coupling leg, and the external gripping surfaces of the coupling portion of the cutting head are arranged at the level of the stop surfaces of the cutting head. Hereby, the coupling portion of the tool body and the coupling portion of the cutting head can be given a relatively compact design with a comparatively short extension in axial direction.

Other favorable features of the tool according to the invention will appear from the following description.

Aspects of the invention also relate to a tool body and to a cutting head.

Other favorable features of the tool body according to the invention and the cutting head according to the invention will appear from the following description.

BRIEF DESCRIPTION OF THE DRAWINGS

The invention will in the following be more closely described by means of embodiment examples, with reference to the appended drawings. It is shown in:

FIG. 1 a perspective view of a cutting head and a tool bode included in a tool according to an embodiment of the present invention in the form of a twist drill, with the cutting head and the tool body shown separated from each other, FIG. 2 a perspective view corresponding to FIG. 1, but with the cutting head attached to the tool body, FIG. 3 a lateral view of the tool according to FIG. 2, FIG. 4 a perspective view of the front part of the tool according to FIG. 2, FIG. 5 a lateral view in a first rotary position of the front part of the tool body included in the tool according to FIG. 2, FIG. 6 a lateral view in a second rotary position of the front part of the tool body, FIG. 7 a perspective view of the front part of the tool body, FIG. 8 a perspective view from the front of the cutting head included in the tool according to FIG. 2, FIG. 9 a lateral view of the cutting head, FIG. 10 a perspective view from behind of the cutting head, FIG. 11 a cross-section along the line XI-XI in FIG. 3, with the cutting head shown in an engagement position, and FIG. 12 the cross-section of FIG. 11, with the cutting head shown in a free position.

DETAILED DESCRIPTION

The tool 1 of the invention is intended to be rotated for cutting machining of a workpiece. In the illustrated example, the tool is designed as a twist drill, but the tool of the invention could also be designed as another type of tool for rotary cutting machining, such as for instance a milling cutter or the similar.

The intended direction of rotation of the tool 1 for machining is marked with the arrow R in FIGS. 2, 4 and 11-12. This direction of rotation is in the following denominated "machining direction of rotation" and consequently constitutes the direction in which the tool is intended to be rotated in order to achieve cutting machining of a, preferably metallic, workpiece. Alternatively, the workpiece can be rotated while the tool is kept stationary.

The tool 1 comprises a tool body 10 and a replaceable cutting head 30, which is detachably attachable to the tool body.

The cutting head 30 is formed in a one piece of a suitable cemented carbide, i.e. made of pressed or injection moulded cemented carbide. "Cemented carbide" here refers to WC, TiC, TaC, NbC etc, in sintered combination with a binder metal, such as for instance Co or Ni. The cutting end is preferable at least partially coated with a layer of for instance Al2O3, TiN and/or TiCN. I some cases, it can be suitable to have the cutting edges made of superhard materials, such as CBN or PCD, attached by soldering. The tool body 10 is likewise made in one piece, preferably of steel or other suitable metallic material.

Figure 5:
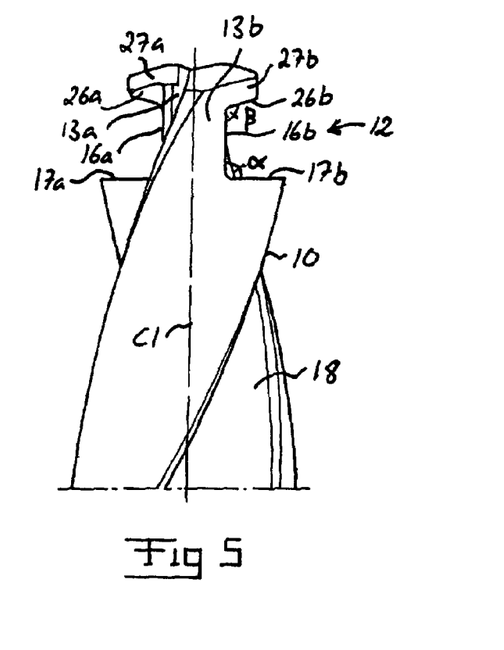

The tool body 10 is symmetrically designed as seen in cross-section. At its rear end, the tool body 10 has an attachment portion 11, through which the tool body is intended to be attached to a chuck or the similar of a drilling machine or another suitable type of working machine. At its front end, the tool body has a coupling portion 12 for receiving a corresponding coupling portion 32 of the cutting head. As appears from FIGS. 5-7, the coupling portion 12 of the tool body is provided with two coupling legs 13a, 13b projecting in the axial direction of the tool body and arranged on opposite sides of the center axis C1 of the tool body. Between the coupling legs 13a, 13b there is a space 14 for receiving the coupling portion 32 of the cutting head. Internal gripping surfaces 15a, 15b are arranged in this space 14. These internal gripping surfaces are designed for engagement with corresponding external gripping surfaces 35a, 35b (see FIGS. 8-12) of the coupling portion of the cutting head, as will be more closed described below. In the illustrated example, these gripping surfaces 15a, 15b are two in number.

Figure 6:
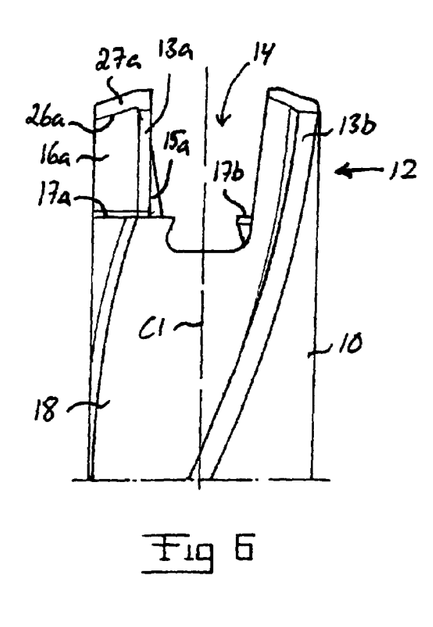
Figure 7:
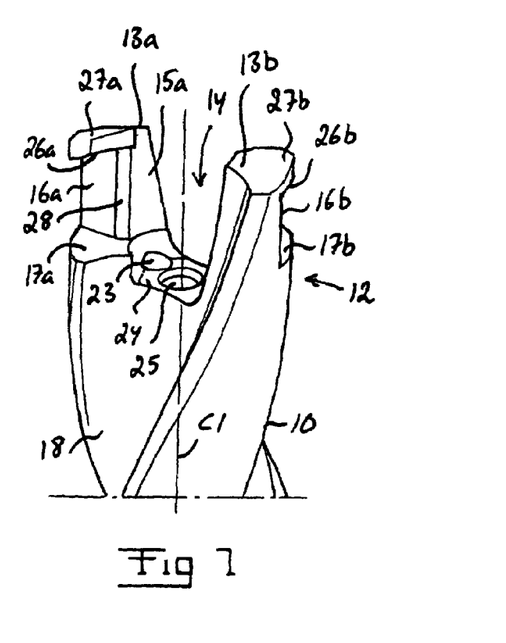

The respective coupling leg 13a, 13b is provided with a surface 16a, 16b, here denominated stop surface, which is designed for abutment against a corresponding stop surface 36a, 36b (see FIGS. 8-12) of the coupling portion of the cutting head in order to transfer torque from the tool body to the cutting head during rotation of the tool in its machining direction of rotation R. The internal gripping surfaces 15a, 15b of the coupling portion of the tool body are suitably arranged on the inside of a respective one of the coupling legs 13a, 13b at the level of the stop surface 16a, 16b of the coupling leg, as illustrated in FIGS. 6 and 7.

In the respective coupling leg 13a, 13b, the stop surface 16a, 16b of the coupling leg borders on a support surface 17a, 17b extending perpendicularly to the center axis of the tool body. Each one of these support surfaces 17a, 17b is designed for abutment against a corresponding support surface 37a. 37b (see FIGS. 9 and 10) of the coupling portion of the cutting head in order to carry axial forces when the cutting head 30 is pressed against a workpiece. The respective stop surface 16a, 16b of the coupling portion 12 of the tool body is suitably parallel with the center axis C1 of the tool body, in which case the stop surface 16a, 16b consequently extends perpendicularly to the support surface 17a, 17b bordering thereon. The respective stop surface 16a, 16b could alternatively starting out from its rear edge facing the rear end of the tool body, be inclined forward in the intended machining direction of rotation R of the tool body, in which case the angle α between the stop surface 16a, 16b and the support surface 17a, 17b bordering thereon suitably is between 75-90°.

Figures 1, 2:
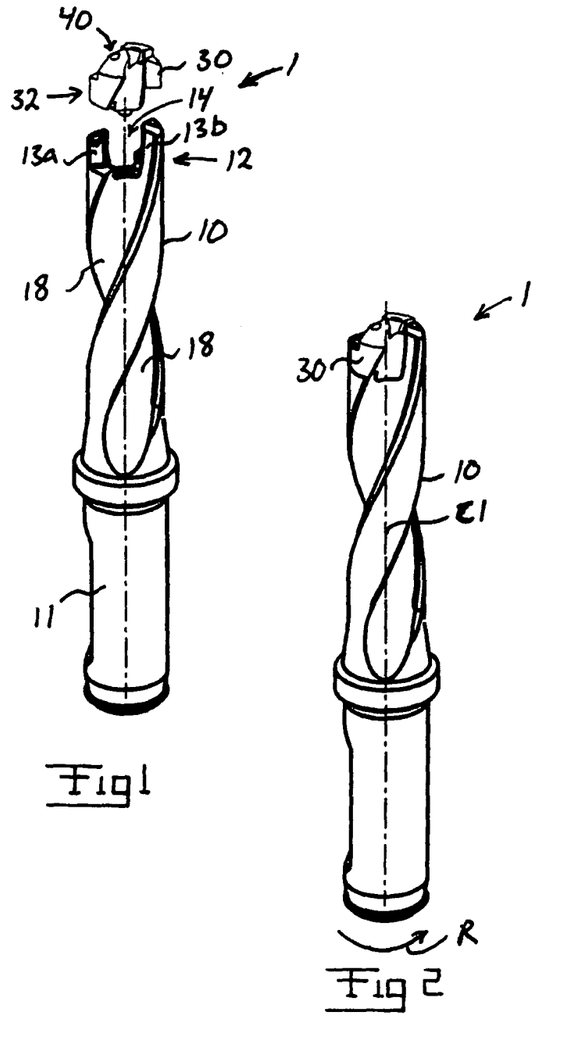
Figure 3:
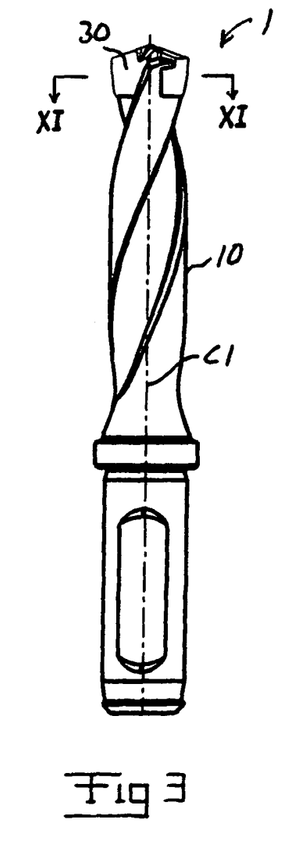
Figure 4:
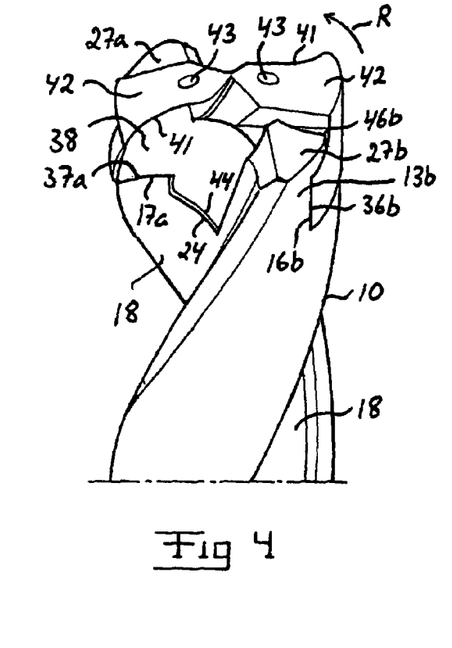
Figure 8:
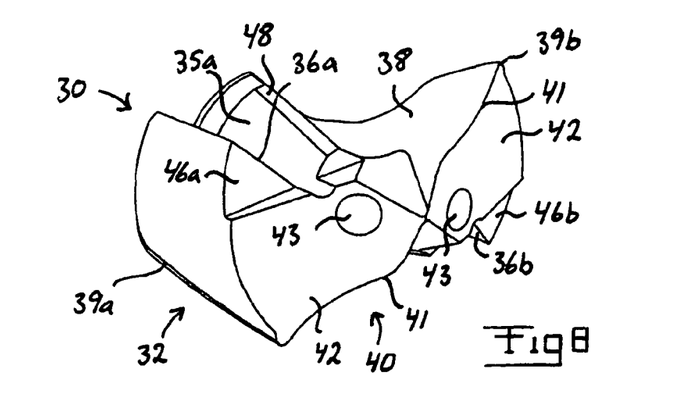
Figure 9:
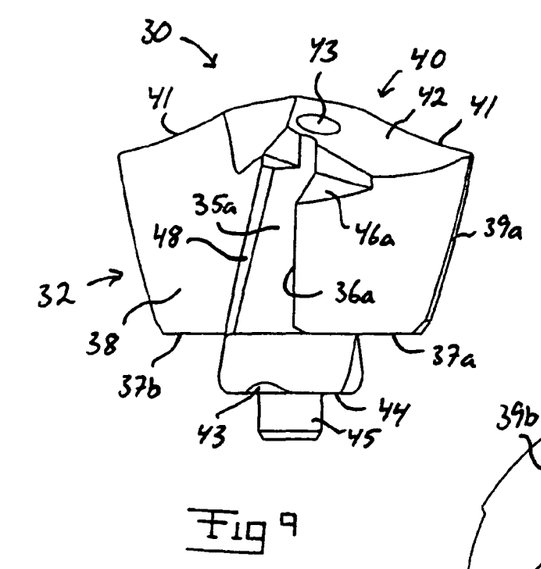
Figure 10:
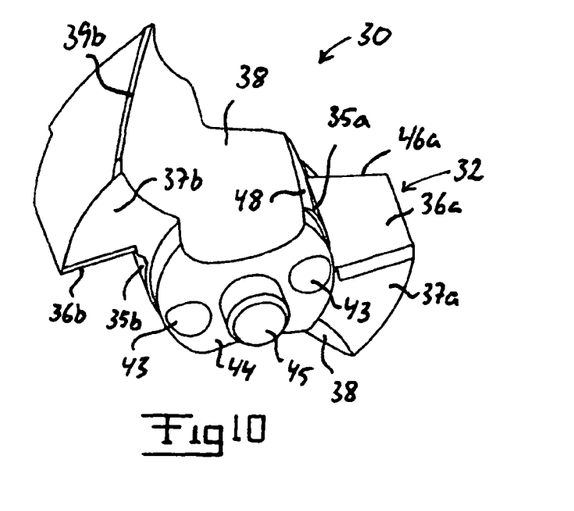

The replaceable cutting head 30 of the tool is shown in closer detail in FIGS. 8-10. The cutting head is symmetrically designed as seen in cross-section. At its front end, the cutting head has a cutting portion 40, which in a conventional manner comprises at least one cutting edge 41 extending in the radial direction of the cutting head. In the illustrated example, the cutting head 30 is provided with two cutting edges 41. Behind the respective cutting edge 41, as seen in the machining direction of rotation R of the cutting head, a clearance surface 42 is arranged. In the illustrated example, a coolant channel 43 opens into the respective clearance surface 42. At its other end, the respective coolant channel 43 opens into a bottom surface 44 on the underside of the cutting head. When the cutting head 30 is attached to the tool body 10, the respective coolant channel 43 is connected to a corresponding coolant channel 23 which extends through the tool body and which opens into a bottom surface 24 of the space 14 between the coupling legs 13a, 13b of the tool body (see FIG. 7). The distance in axial direction between the bottom surface 24 of the space 14 and the support surfaces 17a, 17b of the tool body is suitably somewhat larger than the distance in axial direction between the bottom surface 44 of the cutting head 30 and the support surfaces 37a, 37b of the cutting head, so that there is a small clearance between these bottom surfaces 24, 44 when the support surfaces 37a, 37b of the cutting head abut against the support surfaces 17a, 17b of the tool body, as illustrated in FIG. 4.

The above-mentioned coupling portion 32, which is designed for engagement with the coupling portion 12 of the tool body and receivable in the space 14 between the coupling legs 13a, 13b of the coupling portion of the tool body, is located below the cutting portion 40. External gripping surfaces 35a, 35b are arranged on the coupling portion 32 of the cutting head on either side of the center axis of the cutting head. In the illustrated example, these gripping surfaces 35a, 35b are two in number. The external gripping surfaces 35a, 35b of the cutting head are designed for engagement with the corresponding internal gripping surfaces 15a, 15b in the space 14 of the coupling portion 12 of the tool body. Furthermore, the coupling portion 32 of the cutting head is provided with two stop surfaces 36a, 36b arranged on opposite sides of the center axis of the cutting head, each of which being designed for abutment against the stop surface 16a, 16b of one of the coupling legs 13a, 13b of the coupling portion of the tool body. The external gripping surfaces 35a, 35b of the coupling portion of the cutting head are suitably arranged at the level of the stop surfaces 36a, 36b of the cutting head, as illustrated in FIGS. 8-10.

The respective stop surface 36a, 36b of the cutting head borders on a support surface 37a, 37b extending perpendicularly to the center axis of the cutting head. These support surfaces 37a, 37b are designed for abutment against the corresponding support surfaces 17a, 17b of the coupling portion of the tool body. The respective stop surface 36a, 36b is suitably parallel with the center axis of the cutting head, in which case the stop surface 36a, 36b consequently extends perpendicularly to the support surface 37a, 37b bordering thereon. In the case when the stop surfaces 16a, 16b of the tool body are inclined in the above-mentioned manner, the stop surfaces 36a, 36b of the cutting head consequently have a corresponding inclination so that the respective stop surface of the cutting head is able to come into flat abutment against the corresponding stop surface of the tool body.

Figure 11:
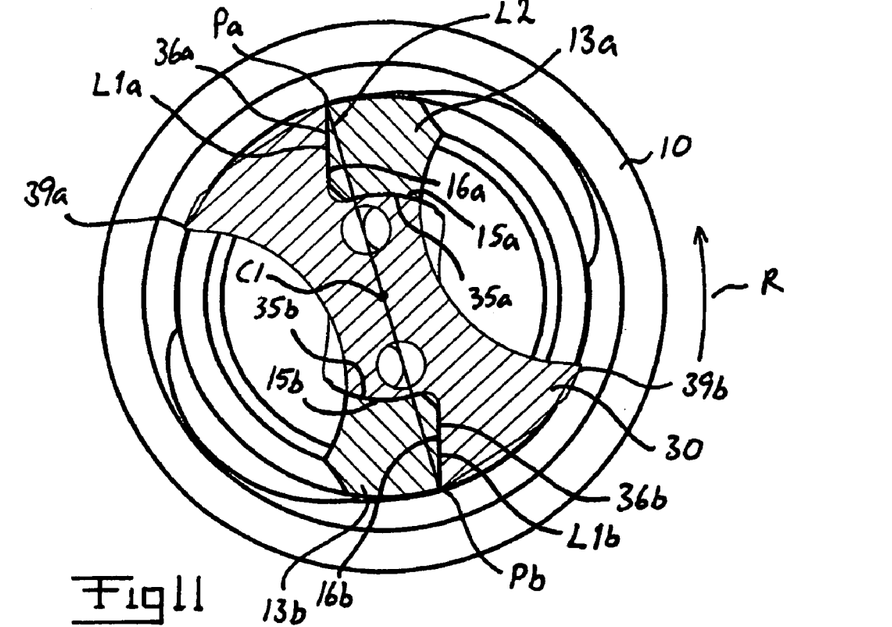
Figure 12:
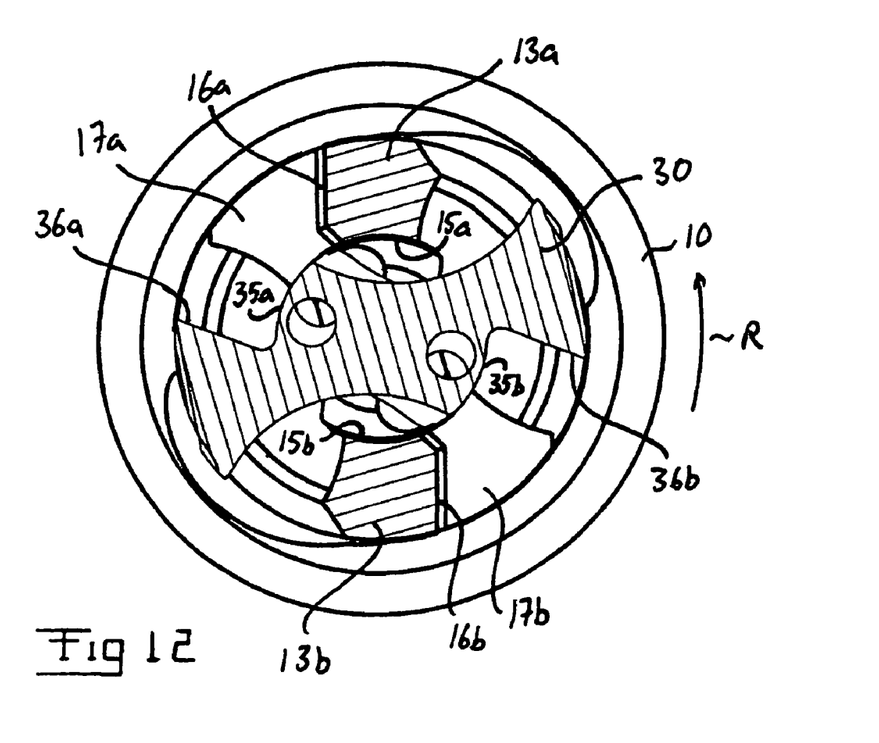

The coupling portion 32 of the cutting head is turnable in the space 14 of the coupling portion 12 of the tool body about the center axis of the cutting head to and fro between:

- a free position (see FIG. 12), in which the stop surfaces 36a, 36b of the coupling portion of the cutting head do not abut against the corresponding stop surfaces 16a, 16b of the coupling legs 13a, 13b and the gripping surfaces 35a, 35 of the cutting head are not in holding engagement with the corresponding gripping surfaces 15a, 15b of the tool body; and
- an engagement position (see FIG. 11), in which the stop surfaces 36a, 36b of the coupling portion of the cutting head abut against the corresponding stop surfaces 16a, 16b of the coupling legs and the gripping surfaces 35a, 35b or the cutting head are in holding engagement with the corresponding gripping surfaces 15a, 15b of the tool body.

When the cutting head 30 is in said free position, the cutting head can be moved in axial direction away from the tool body 10, out of the space 14 between the coupling legs 13a, 13b of the tool body. When the cutting head 30 is in said engagement position, the cutting head is locked to the tool body 10 and the tool 1 is ready for machining of a workpiece. The turning of the cutting head 30 between the free position and the engagement position or vice versa is suitably performed by means of an implement in the form of a key of the like, which is brought into temporary engagement with the cutting head.

The respective stop surface 16a, 16b of the tool body is suitably so arranged that it has its extension in a plane which does not cross the center axis C1 of the tool body, in which case the corresponding stop surface 36a, 36b of the cutting head consequently has its extension in a plane which does not cross the center axis of the cutting head. As seen in a cross-section through the tool body 10 and the cutting head 30 (see FIG. 11), the lines of contact L1a, L1b between the respective stop surface 16a, 16b of the tool body and the corresponding stop surface 36a, 36 of the cutting head in this case extends at an angel in relation to a line L2 crossing the center axis C1 of the tool body and the radial extreme points Pa, Pb of the lines of contact L1a and L1b, the distance between the respective line of contact L1a, L1b and the line L2 increasing in the direction towards the center of the tool. Starting out from its radial extreme point Pa, Pb, the respective line of contact L1a, L1b is inclined forward in relation to the line L2 in the intended machining direction of rotation R of the tool. This results in that the cutting head 30 through the stop surfaces 36a, 36b, 16a, 16b will exert a force on the coupling legs 13a, 13b of the tool body directed towards the center of the tool during machining of a workpiece, which in its turn results in that the internal gripping surfaces 15a, 15b of the coupling legs are pressed against the corresponding external gripping surfaces 35a, 35b of the cutting head. Hereby, the mutual holding between these gripping surfaces is consequently promoted. The angle between the line L2 and the respective line of contact L1a, L1b is suitable between 10-30°.

Two chip flutes 18 are arranged on the outside of the tool body and extend, preferably helically, diametrically opposite each other along the tool body 10 from an area in the vicinity of the attachment portion 11 and up to the coupling portion 12. Each one of these chip flutes 18 extends up to an area between the two coupling legs 13a, 13b and is arranged to connect to a corresponding chip flute 38 on the outside of the cutting head when the cutting head 30 is attached to the tool body 10. The chip flutes 18, 38 could alternatively be rectilinear instead of helical. The chip flutes 18, 38 are intended to carry away the chips generated by the cutting edges 41 during machining of a workpiece.

The cutting head 30 is provided with two guide edges 39a, 39b arranged diametrically opposite each other, which constitute the extreme surfaces of the cutting head in radial direction and which extend in the axial direction of the cutting head. During the drilling of a bore, the tool 1 abuts against the hole wall of the bore through these guide edges 39a, 39b, the guide edges guiding the tool 1 so that the bore will be straight and round. By arranging the gripping surfaces 35a, 35b of the cutting head at the level of its stop surfaces 36a, 36b, the cutting head 30 can be given a comparatively short extension in axial direction while maintaining a given length of the guide edges 39a, 39b, or the guide edges 39a, 39b can be given a comparatively long length while maintaining a given extension in axial direction of the cutting head.

If so considered suitable, the cutting head 30 can on its underside be provided with a centrally located guide pin 45 projecting in the axial direction of the cutting head, which guide pin is arranged to be received in a corresponding central recess 25 in the bottom of the space 14 between the coupling legs 13a, 13b when the coupling portion 32 of the cutting head is inserted into this space 14. Hereby, the initial centering of the coupling portion 32 of the cutting head in the space 14 is facilitated in connection with the mounting of the cutting head to the tool body. The guide pin 45 is suitably chamfered at its outer free end.

The respective coupling leg 13a, 13b is provided with a shoulder 26a, 26b, which protrudes from the stop surface 16a, 16b of the coupling leg and which extends a distance out over the support surface 17a, 17b of the coupling leg. The angle β between this shoulder 26a, 26b and the stop surface 16a, 16b bordering thereon is suitably between 70-110°. In the case when the stop surfaces 16a, 16b of the tool body extend in parallel with the center axis of the tool body, the angel between the stop surface 16a, 16b of the respective coupling leg and the shoulder 26a, 26b protruding therefrom is suitably between 80-90°, preferably 90°. The respective shoulder 26a, 26b is formed by a hook-shaped protrusion 27a, 27b on the respective coupling leg 13a, 13b, which protrusion 27a, 27b protrudes from the coupling leg in the intended machining direction of rotation R.

The cutting head 30 is provided with two shoulders 46a, 46b facing the front end of the cutting head and arranged on opposite sides of the center axis of the cutting head, which border on a respective one of said stop surfaces 36a, 36b of the coupling portion of the cutting head and are arranged to extend in under a respective one of said shoulders 26a, 26b of the coupling legs 13a, 13b of the tool body when the coupling portion 32 of the cutting head is in the engagement position in the space 14 of the coupling portion 12 of the tool body, so as to thereby prevent the cutting head 30 from being displaced in axial direction away from the tool body 10. The shoulder 26a, 26b of the respective coupling leg 13a, 13b is consequently designed to extend out over the corresponding shoulder 46a, 46b of the cutting head 30 when the cutting head is attached to the tool body 10. In order to avoid wear between the shoulders 26a, 26b, 46a, 46b, there is suitably, in the normal state of the tool, a small clearance between the respective shoulder 26a, 26b of the coupling legs 13a, 13b and the corresponding shoulder 46a, 46b of the cutting head 30 when the coupling portion 32 of the cutting head is in the engagement position in the space 14 of the coupling portion 12 of the tool body. The normal state of the tool here refers to the state when the coupling portion 32 of the cutting head is in the engagement position in the space 14 between the coupling legs 13a, 13b and the support surfaces 37a, 37b of the cutting head abut against the corresponding support surfaces 17a, 17b of the tool body. The shoulders 26a, 26b, 46a, 46b are only intended to abut against each other When the cutting head 30 is jammed in a bore during the pulling of the tool 1 out of the bore.

Each one of said shoulders 46a, 46b of the cutting head 30 is suitably arranged on the upper side of the cutting head and is preferably formed by a depression in one of the clearance surfaces 42 arranged on the upper side of the cutting head. In the illustrated example, said shoulders 26a, 26b, 46a, 46b have such an inclination that they essentially follow the angle of inclination of the clearance surfaces 42 of the cutting head, but these shoulders could alternatively be arranged to extend perpendicularly to the center axis C1 of the tool body and the center axis of the cutting head, respectively.

The internal gripping surfaces 15a, 15b of the coupling portion 12 of the tool body are suitably cylindrical and arranged to extend in parallel with the center axis C1 of the tool body, in which case the corresponding external gripping surfaces 35a, 35b of the coupling portion of the cutting head are cylindrical and arranged to extend in parallel with the center axis of the cutting head. These cylindrical external gripping surfaces 35a, 35b of the cutting head have a radius that is somewhat larger than the radius of the cylindrical internal gripping surfaces 15a, 15b of the tool body, so that there will be a certain elastic deflection of the coupling legs 13a, 13b in radial direction when the coupling portion 32 of the cutting head is turned from the free position to the engagement position. Hereby, a stable mutual grip between the gripping surfaces is obtained.

In order to facilitate the turning of the cutting head 30 from the free position to the engagement position, the coupling portion 32 of the cutting head is provided with two guide surfaces 48 arranged diametrically opposite each other, which extend in the axial direction of the cutting head. Each one of these guide surfaces 48 is formed by a chamfer in the transition between a chip flute 38 and the gripping surface 35a, 35b bordering on the chip flute, and follows the helical path of the chip flute. Guide surfaces 28 are likewise arranged on the respective coupling leg 13a, 13b, these guide surfaces 28 being formed by a chamfer in the transition between the stop surface 16a, 16b and the gripping surface 15a, 15b of the coupling legs 13a, 13b.

The invention is of course not in any way limited to the embodiments described above. On the contrary, several possibilities to modifications thereof should be apparent to a person skilled in the art without departing from the basic idea of the invention as defined in the appended claims.

The disclosures in Swedish patent application No. 0800833-6, from which this application claims priority, are incorporated herein by reference.

The invention claimed is:

1. A tool for rotary cutting machining, comprising:
   a tool body and a replaceable cutting head detachably attachable to the tool body,
      the tool body comprising, at a front end thereof, a coupling portion with two coupling legs projecting in an axial direction of the tool body and arranged on opposite sides of a center axis of the tool body;
      the cutting head comprising a coupling portion, the coupling portion of the cutting head being designed for engagement with the coupling portion of the tool body and being receivable in a space between the coupling legs of the coupling portion of the tool body;
      wherein internal gripping surfaces are arranged in the space of the coupling portion of the tool body, the internal gripping surfaces being designed for engagement with corresponding external gripping surfaces of the coupling portion of the cutting head;

each respective coupling leg being provided with a stop surface adapted to transfer torque from the tool body to the cutting head, the stop surface being adapted to abut against a corresponding stop surface of the coupling portion of the cutting head and extending parallel with the center axis of the tool body or, starting out from its rear edge, inclined forward in an intended machining direction of rotation of the tool body;

the coupling portion of the cutting head being turnable in the space of the coupling portion of the tool body about a center axis of the cutting head to and fro between a free position, in which the stop surfaces of the coupling portion of the cutting head do not abut against the stop surfaces of the coupling legs and the gripping surfaces of the cutting head are not in holding engagement with the corresponding gripping surfaces of the tool body, and an engagement position, in which the stop surfaces of the coupling portion of the cutting head abut against the corresponding stop surfaces of the coupling legs and the gripping surfaces of the cutting head are in holding engagement with the corresponding gripping surfaces of the tool body;

each respective coupling leg being provided with a shoulder protruding from the stop surface of the coupling leg; and the cutting head being provided with two shoulders facing a front end of the cutting head and arranged on opposite sides of the center axis of the cutting head, the shoulders bordering on a respective one of the stop surfaces of the coupling portion of the cutting head and being arranged to extend in under a respective one of the shoulders of the coupling legs of the tool body when the coupling portion of the cutting head is in the engagement position in the space of the coupling portion of the tool body so as to thereby prevent the cutting head from being displaced in axial direction away from the tool body, wherein the stop surfaces on the coupling legs of the tool body and the stop surfaces of the coupling portion of the cutting head are angled so that, when the coupling portions of the cutting head and the tool body are in the engagement position, forces transmitted to the stop surfaces of the coupling legs of the tool body from the stop surfaces of the cutting head are at least partially directed toward the center axis of the tool body so that the coupling legs are pressed toward the center axis of the tool body and the internal gripping surfaces of the coupling portion of the tool body are urged against the external gripping surfaces of the coupling portion of the cutting head.

2. A tool according to claim 1, wherein, in each respective coupling leg, the stop surface of the coupling leg borders on a support surface extending perpendicularly to the center axis of the tool body, the support surface being adapted to abut against a corresponding support surface of the coupling portion of the cutting head in order to carry axial forces, an angle between each stop surface and the support surface of the coupling leg being between 75-90°, and the shoulder bordering on this stop surface extending generally in the intended direction of machining out over the support surface.

3. A tool according to claim 1, wherein, in each respective coupling leg, an angle between the stop surface of the coupling leg and the shoulder protruding from the stop surface is between 70-110°.

4. A tool according to claim 1, wherein, in each respective coupling leg, the stop surface of the coupling leg extends in parallel with the center axis of the tool body, and the stop surfaces of the cutting head extend in parallel with the center axis of the cutting head.

5. A tool according to claim 4, wherein, in each respective coupling leg, an angle between the stop surface of the coupling leg and the shoulder protruding from the stop surface is between 80-90°.

6. A tool according to claim 1, wherein there is a clearance, in the normal state of the tool, between each respective shoulder of the coupling legs and the corresponding shoulder of the cutting head when the coupling portion of the cutting head is in the engagement position in the space of the coupling portion of the tool body.

7. A tool according to claim 1, wherein each one of the shoulders of the cutting head is arranged on the upper side of the cutting head and is formed by a depression in a clearance surface arranged on the upper side of the cutting head.

8. A tool according to claim 1, wherein:
the internal gripping surfaces of the coupling portion of the tool body are cylindrical and extend in parallel with the center axis of the tool body; and
the external gripping surfaces of the coupling portion of the cutting head are cylindrical, extend in parallel with the center axis of the cutting head and have a radius which is larger than the radius of the internal gripping surfaces.

9. A tool according to claim 1, wherein the internal gripping surfaces of the coupling portion of the tool body are arranged on insides of respective ones of the coupling legs at a level of the stop surface of the respective coupling leg, and the external gripping surfaces of the coupling portion of the cutting head are arranged at a level of respective ones of the stop surfaces of the cutting head.

10. A tool according to claim 1, wherein two chip flutes are arranged on the outside of the tool body and extend diametrically opposite each other along the tool body, each one of the chip flutes extending up to an area between the two coupling legs and being arranged to connect to a corresponding chip flute on an outside of the cutting head when the coupling portion of the cutting head is in the engagement position in the space of the coupling portion of the tool body.

11. A tool body intended to be attached to a replaceable cutting head in order to form a tool for rotary cutting machining, the tool body comprising:
a front end having a coupling portion with two coupling legs projecting in an axial direction of the tool body and arranged on opposite sides of a center axis of the tool body, and a space arranged between the coupling legs for receiving a coupling portion of the cutting head;
internal gripping surfaces arranged in the space of the coupling portion of the tool body, the internal gripping surfaces being adapted to engage with corresponding external gripping surfaces of the coupling portion of the cutting head; and
each respective coupling leg being provided with a stop surface adapted to transfer torque from the tool body to the cutting head, the stop surface being adapted to abut against a corresponding stop surface of the coupling portion of the cutting head and extending parallel with the center axis of the tool body or, starting out from its rear edge, inclined forward in an intended machining direction of rotation of the tool body,
each respective coupling leg being provided with a shoulder protruding generally in the intended machining direction from the stop surface of the coupling leg, the shoulder being adapted to extend out over a shoulder of the cutting head facing the front end of the cutting head, when the tool body is attached to the cutting head, so as to thereby prevent the cutting head from being displaced in axial direction away from the tool body, wherein the stop surfaces on the coupling legs of the tool body are angled so that forces transmitted generally perpendicular to the stop surfaces of the coupling legs of the tool body are at least partially directed toward the center axis of the tool body so that the coupling lees will be pressed toward the center axis of the tool body and the internal gripping surfaces of the coupling portion of the tool body are urged toward the center axis of the tool body.

12. A tool body according to claim 11, wherein, in each respective coupling leg, the stop surface of the coupling leg borders on a support surface extending perpendicularly to the center axis of the tool body, the support surface being adapted to abut against a corresponding support surface of the coupling portion of the cutting head in order to carry axial forces, an angle between this stop surface and the support surface being between 75-90°, and the shoulder bordering on the stop surface extending generally in the intended direction of machining out over this support surface.

13. A tool body according to claim 11, wherein, in each respective coupling leg, the stop surface of the coupling leg extends in parallel with the center axis of the tool body.

14. A tool body according to claim 13, wherein, in each respective coupling leg, an angle between the stop surface of the coupling leg and the shoulder protruding from the stop surface is between 80-90°.

15. A cutting head detachably attachable to a tool body, the cutting head comprising:
  a coupling portion, the coupling head being adapted to engage with a coupling portion of the tool body and the coupling head being receivable in a space between coupling legs of the coupling portion of the tool body;
  external gripping surfaces arranged on the coupling portion of the cutting head, the gripping surfaces being adapted to engage with corresponding internal gripping surfaces in the space of the coupling portion of the tool body; and
  the coupling portion of the cutting head being provided with two stop surfaces arranged on opposite sides of a center axis of the cutting head, each of the stop surfaces being adapted to abut against a stop surface of one of the coupling legs of the coupling portion of the tool body, and
  two shoulders facing the front end of the cutting head and arranged on opposite sides of the center axis of the cutting head, the shoulders being adapted to border on a respective one of the stop surfaces of the coupling portion of the cutting head and being arranged to extend generally opposite an intended direction of machining and adapted to extend in under a respective shoulder of the coupling legs of the tool body when the cutting head is attached to the tool body,
  wherein the stop surfaces on the stop surfaces of the coupling portion of the cutting head are angled and are adapted to transmit forces generally perpendicular to the stop surfaces of the coupling portion of the cutting head so that the forces are at least partially directed toward the center axis of the cutting head.

16. A cutting head according to claim 15, wherein each one of the shoulders of the cutting head is arranged on an upper side of the cutting head and is formed by a depression in a clearance surface arranged on the upper side of the cutting head.

* * * * *